Patented Dec. 18, 1934

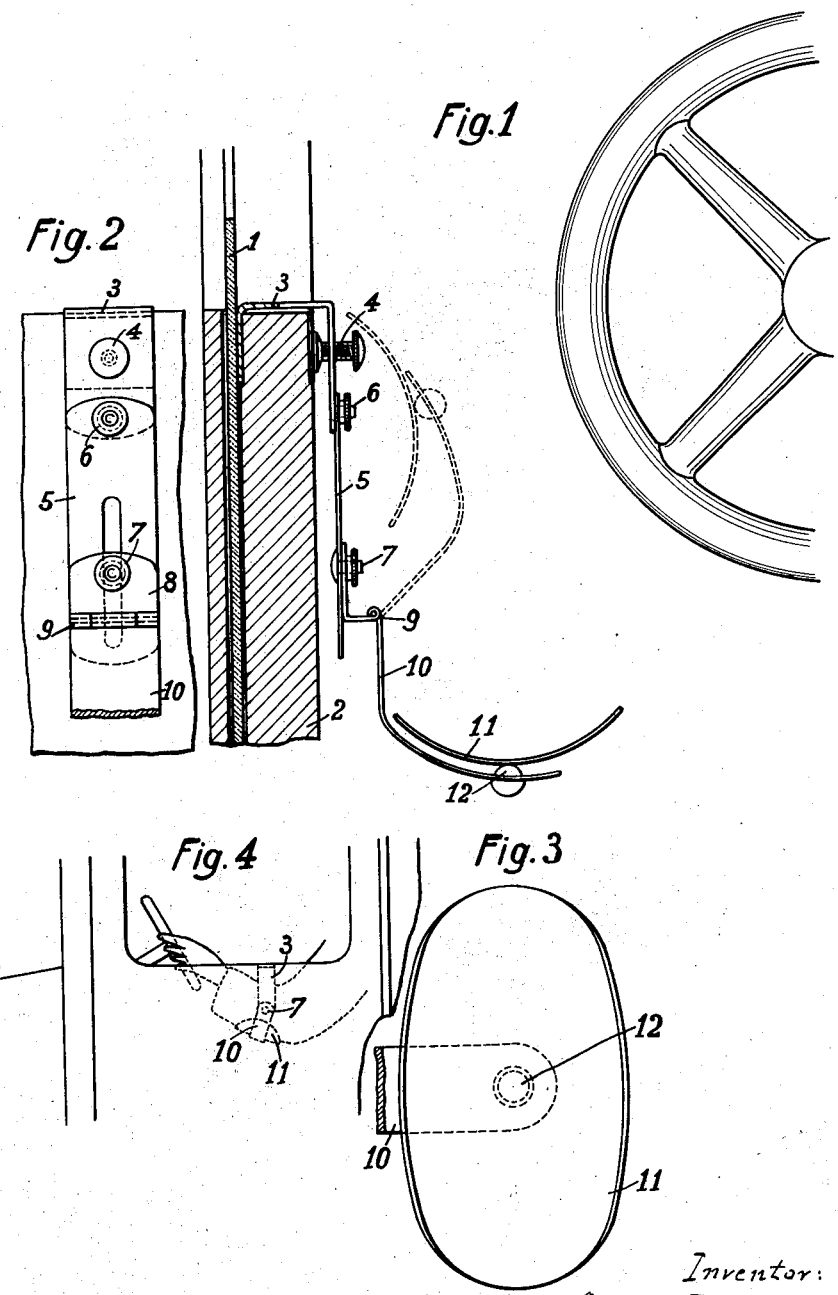

1,984,855

UNITED STATES PATENT OFFICE 1,984,855

ARM-REST IN VEHICLES FOR DRIVERS

Oscar Zwierzina, Berne, Switzerland

Application October 15, 1932, Serial No. 637,937
In Switzerland November 27, 1931

3 Claims. (Cl. 155—198)

This invention relates to arm-rests in vehicles for the driver.

Owing to the fact that close to the steering wheel of a vehicle, e. g. a motor-car or aircraft, there is lacking for at least one arm a support or rest which affords it a support in its steering position, the arm soon becomes tired and the safety of the driver is thereby materially lessened. In order to combat such weariness as much as possible, most drivers hang the arm out of the open window, whereby the arm is liable to become stiff and, when the hand is required on the wheel, generally arrives there too late. Many accidents are caused in this manner without its being known that the arm hanging out of the window was the direct cause. If an unforeseen occurrence happens, such as the bursting of a tire or the like, which necessitates that the steering wheel shall be turned particularly promptly, and when a fraction of a second is important, if one arm and hand are hanging out of the window the driver is not able properly to steer the vehicle with the other arm and its hand on the wheel, and the hand out of the window cannot be moved rapidly enough to the wheel to assist in steering and combating the danger.

An object of the present invention is to obviate this danger, and to provide an improved construction of arm rest for the driver of a vehicle.

According to the invention, at least one arm-rest is arranged laterally of the driver's seat for the driver's arm extended to handle the steering wheel, which arm-rest is so constructed that it affords to the arm such a point of support that the support of the arm, and with it the power of the same and its hand, remain unimpaired independently of the rotation of the steering wheel with which the direction of the arm changes.

Preferably, the arm-rest can be adjusted in height, and is connected by a universal joint with a bracket mounted on the side of the vehicle.

Conveniently, when not in use, the arm-rest can be folded to lie out of reach of the arm.

Alternatively, a support of the arm-rest may stand on the vehicle floor beside the driver, and it may be arranged to move to-and-fro in the fore-and-aft direction of the vehicle.

One embodiment of the invention is diagrammatically illustrated by way of example in the accompanying drawing, wherein:—

Figure 1 is a sectional elevation showing part of a steering wheel and one form of arm-rest according to the invention adjacent thereto as viewed looking towards the wheel, Figure 2 is an elevation of the arm-rest as viewed at right-angles to Figure 1, Figure 3 is a plan view of the arm-rest, and Figure 4 is an elevation with the door closed.

Like reference characters designate like parts throughout the several views.

Referring to the drawing, in the vacant space between the window 1 and the inner side 2 of the space for the driver's seat, a bail 3 of adjustable width is supported by a holding member or set screw 4 passing laterally through one of the U-clip members to engage the inner wall 2. A bar 5 is pivoted at 6 to the bail 3, and an L-shaped bracket 8 is mounted adjustable in height on the bar 5 by means of a nut equipped screw 7. A support 10 for an arm-rest 11 is hinged at 9 on the horizontal limb of the bracket 8 so as to swing up and down. The arm-rest 11 is rotatably and adjustably carried by the support 10 on its lower limb, and rests on a ball 12 so that it can readily move angularly in all directions about two axes lying transversely one of another. When an arm lies on the rest 11 the latter can swing with the arm laterally about the point 9, and can adapt itself to the desired position of the arm in every direction.

After the described arm-rest has been fixed in a vehicle the arm nearest the window, whose hand assists in steering, is supported at all times, and automatically follows the changing rotation of the steering wheel without inconvenience. Consequently, the driver has his arm conveniently and suitably supported during the entire journey, whereby the arm does not become tired. As the height of the arm-rest is adjustable by shifting the bracket 8 up and down the bar 5, it can be suited to the size of each driver. When not in use, the arm-rest can be folded about the hinge 9, as indicated in broken lines in Figure 1. All the pivots may be formed as universal or part-universal joints and may be provided with balls or rollers.

Instead of being carried by a bracket, as illustrated, the arm-rest may be mounted on a standard fixed to the floor of the vehicle.

The described arm-rest may be arranged elsewhere in a vehicle, for example for the seat next to the driver at the opposite side, or at some other position for a person sitting near the driver.

In aircraft, the arm-rest may be employed in the same manner as in motor-driven road vehicles. In this case, however, it will preferably be arranged left and right of the steering member so that both arms of the pilot can be supported.

I claim:—

1. For a motor-driven vehicle, a device of the character described comprising in combination a means supported on the vehicle structure, a bar pivoted to said means to swing in the fore-and-aft direction of the vehicle at one side of the steering member, a bracket adjustably carried on said bar, an L-shaped support hinged by its vertical limb to said bracket, and an arm-rest mounted to rock on the horizontal limb of the support.

2. For a motor-driven vehicle, a device of the character described comprising in combination an L-shaped bail held on the vehicle structure, a bar pivoted to one branch of said bail, a bracket adjustably carried by said bar, a support hinged to said bracket for folding movement, said support to be moved fore and aft about the pivot pin of said bar, and a universal joint, an arm-rest mounted on the support by said universal joint so as to swing in all directions.

3. An arm-rest for use in vehicles comprising a bail adjustably secured to a wall of the vehicle in the space between said wall and the steering member of the vehicle, a plate pivotally attached to the bail, and a substantially L-shaped bracket vertically adjustably mounted on said plate, a support hinged to one arm of said bracket for displacement in the vertical, an arm-rest rotatably carried by said support, and a ball on which said arm-rest is mounted, said ball constituting the means for rotatably carrying said support to readily move angularly in all directions.

OSCAR ZWIERZINA.